United States Patent Office 3,509,193
Patented Apr. 28, 1970

3,509,193
MERCAPTOMETHYL-SUBSTITUTED ORGANO-POLYSILOXANES AND PROCESS THEREOF
Hans Niederprüm, Monheim, and Walter Simmler, Odenthal-Schlinghofen, Germany, assignors to Farbenfabriken Bayer Aktiengesellschaft, Leverkusen, Germany, a corporation of Germany
No Drawing. Filed May 10, 1966, Ser. No. 548,866
Claims priority, application Germany, May 14, 1965,
F 46,055
Int. Cl. C07f 7/08
U.S. Cl. 260—448.2       9 Claims

ABSTRACT OF THE DISCLOSURE

Mercaptomethyl substituted organopolysiloxanes useful as water repellent impregnating agents are prepared by reacting halomethyl-dimethyl-chlorosilanes with hydrogen sulfide in the presence of a tertiary nitrogen base, hydrolyzing the product obtained in the presence of a dilute aqueous acid and reacting the hydrolysate with an organochlorosilane. A representative siloxane produced is $(HS-CH_2-Si(CH_3)_2[OSi(CH_3)_2]_5O-)_3Si-C_6H_5$.

---

This invention relates to organopolysiloxanes, and is especially concerned with the production of organopolysiloxanes which are constituted according to the general formula $$aHSCH_2Si(CH_3)_2O_{1/2} \cdot bRSiO_{3/2}$$
$$\cdot cR_2SiO \cdot (2+b-a)R_3SiO_{1/2}$$

in which $a$ is 1, 2 or $(2+b)$, $b$ is 0 or 1, $c$ is a positive integer, and each substituent R is a hydrocarbon radical which may be neutrally substituted. The invention especially relates to those polysiloxanes in which the substituents R are either exclusively methyl radicals or methyl and phenyl radicals.

It is known that mercaptomethyl-silicon compounds can be obtained by reacting halomethyl-silicon compounds with alkali metal hydrogen sulphides, but in this reaction thioethers are formed to a considerable extent, the yields are consequently reduced, and the reaction products are non-uniform. Moreover, the Si—C and Si—O bonds of polysiloxanes are split by the alkali metal compound. Thus, in the case of siloxanes with more than one halomethyl radical, larger molecules and cross-linking reactions result, instead of the products of the desired structure, due to several secondary reactions.

It is not possible to obviate these modifications of the structure by reacting the halomethyl polysiloxanes in the presence of a base with hydrogen sulphide instead of with the alkali metal salt, since in this case the Si—CH$_2$—SH groups initially formed on part of the polysiloxanes, because of their greater nucleophilicity, react more rapidly with the halomethyl groups still present than does hydrogen sulphide, and thus form higher polymers which are linked via thioether bridges.

We have now found that the mercaptomethyl polysiloxanes defined above are reliably obtained in a high yield by a specific combination of three reaction steps, and, according to the present invention, a process for the production of these compounds comprises (1) mixing chloromethyl- or bromomethyl-dimethyl-chlorosilane with at least twice the molar amount of a tertiary nitrogen base and saturating the mixture with hydrogen sulphide, (2) adding a dilute aqueous acid to the reaction mixture in at least an amount sufficient to dissolve the nitrogen compounds, and freeing the phase containing the hydrolysate of the silicon compounds from water and water-soluble impurities, (3) mixing the remaining product with a diorgano-dichlorosilane or a mixture of organo-chlorosilanes in such a quantity and of such a constitution that

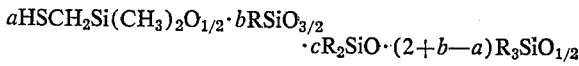

are used for every mol of the halomethyl-dimethyl, chlorosilane initially employed, completely hydrolyzing the total mixture thus obtained by the gradual addition of water, and isolating the co-hydrolysis product by evaporating the volatile impurities.

Suitable organo-chlorosilanes for use in step (3) of the process are dimethyl-dichlorosilane, phenylmethyl-dichlorosilane, methyl trichlorosilane, phenyl trichlorosilane, and trimethyl chlorosilane. A suitable tertiary nitrogen base is triethylamine.

At the start of the process an inert solvent is expediently added, e.g. benzene or toluene, and this is removed by evaporation after the first hydrolysis and after separating the aqueous solution at the end of the second step. A mixture of varying proportions of 1,3-di-(mercaptomethyl)-tetramethyl disiloxane, mercaptomethyl dimethyl silanol and 2,2,5,5-tetramethyl-2,5-disila-1,4-dithiane is obtained as hydrolysate of this step in a practically stoichiometric yield.

It has already been disclosed that by the reaction of chloromethyl dimethyl chlorosilane with hydrogen sulphide and triethylamine the last-mentioned heterocycle of the formula

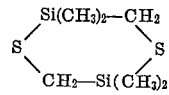

is formed in a yield of 30%, and this yields the disiloxane $$[HS-CH_2-Si(CH_3)_2-]_2O$$

on hydrolysis. Our own experiments, however, have shown that it is not possible to produce the desired copolymers from this disiloxane with diorganosiloxane cyclo-polymers in the presence of sulphuric acid by the equilibration method which is normally used, chiefly for hexamethyl disiloxane. It is surprising that such polysiloxanes with terminal mercaptomethyl groups are readily formed by the co-hydrolysis described above as the third step of the process.

The products prepared according to the invention are suitable as water-repellent impregnating agents, especially for protein-containing materials, as hair cosmetics and as additives to polishing agents for metal.

The following examples are given for the purpose of illustrating the invention.

EXAMPLE 1

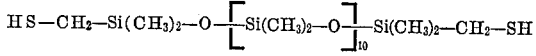

Hydrogen sulphide is introduced into a solution of 750 g. (4 mols) bromomethyl-dimethyl-chlorosilane and 890 g. (8.8 mols) triethylamine in 4 litres anhydrous toluene until saturation is reached, whereby the temperature rises to about 80° C. 2 litres aqueous hydrochloric acid containing 5 percent by weight HCl are then added to the reaction mixture. This is stirred for one hour and the aqueous solution is then separated off. The solvent is evaporated from the toluene solution under reduced pressure and with heating up to 80° C. at 15 mm. Hg; there remain in 443 g. of an oil. This is mixed with 2580 g. (20 mols) dimethyl-dichlorosilane, and 396 g. (22 mols) water are added dropwise to the mixture over a period of 6 hours. The hydrogen chloride thus evolved is passed through a condenser in which the entrained silane is separated and refluxed. The reaction mixture is stirred for a further 4 hours and then freed from the volatile components by heating up to 80° C. at 1 mm. Hg. There remain 1620 g. (84% theoretical) of a yellowish, thinly liquid oil having a refractive index $n_D^{20}$ of 1.4250, a density of 0.985 g./cc. and a viscosity of 12 cp. at 20° C. The product contains 6.4 percent by weight SH groups; the calculated amount for a product of the above formula is 6.8.

EXAMPLE 2

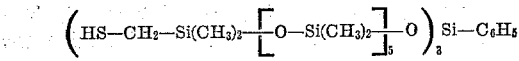

Hydrogen sulphide is introduced into a solution of 286 g. (2 mols) chloromethyl-dimethyl-chlorosilane and 446 g. (4.4 mols) triethylamine in 2 litres anhydrous benzene until saturation is reached and then for a further 2 hours while heating at boiling temperature under reflux. 1 litre aqueous hydrochloric acid containing 5 percent by weight HCl is then added to the reaction mixture. This is stirred for one hour and the aqueous solution is then separated off. The solvent is evaporated from the benzene solution under reduced pressure and the residue (220 g.) is mixed with 141 g. (0.667 mol) phenyl trichlorosilane and 1290 g. (10 mols) dimethyl dichlorosilane. This mixture and 227 g. (12.6 mols) water are then subjected to hydrolysis and co-condensation as described in Example 1, and there are finally obtained 926 g. (88% theoretical) of a slightly yellowish oil having a refractive index $n_D^{20}$ of 1.4271, a density of 0.99 g./cc. and a viscosity of 28 cp. at 20° C. The product contains 5.8 percent by weight SH groups; the calculated amount for a product of the above formula is 6.3.

What we claim is:

1. A process for the production of a mercaptomethyl-substituted organopolysiloxane of the general formula $$aHSCH_2Si(CH_3)_2O_{1/2} \cdot bRSiO_{3/2} \cdot$$
$$cR_2SiO \cdot (2+b-a)R_3SiO_{1/2} \quad (I)$$

in which $a$ is a whole number of 1 to $(2+b)$, $b$ is a whole number from 0 to 1, $c$ is a positive integer, and each substituent R is selected from the group consisting of hydrocarbon radicals and neutrally substituted hydrocarbon radicals; which process comprises (1) mixing halomethyl-dimethyl-chlorosilane selected from the group consisting of chloromethyl and bromomethyl with at least twice the molar amount of a tertiary nitrogen base and saturating the mixture with hydrogen sulphide; (2) adding a dilute aqueous acid to the reaction mixture in an amount at least sufficient to dissolve said nitrogen base, and freeing the phase containing the hydrolysate of the silicon compounds from water and water-soluble impurities; and (3) mixing the resultant phase containing the hydrolysate with at least one organo-chlorosilane having the composition $$\frac{b}{a} \text{ mol } RSiCl_3, \frac{c}{a} \text{ mol } R_2SiCl_2 \text{ and}$$

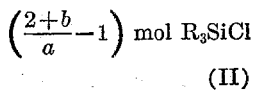

(II)

wherein R is the same as in Formula I, per mol of the halomethyl-dimethyl-chlorosilane initially employed, completely hydrolyzing the total mixture thus obtained by the gradual addition of water, and isolating the co-hydrolysis product by evaporation of the volatile impurities.

2. A process as claimed in claim 1 wherein the initial mixture is diluted with an inert solvent whch is removed by evaporation after carrying out the steps (1) and (2).

3. Process as claimed in claim 1, wherein said organopolysiloxane is

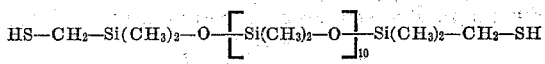

4. Process as claimed in claim 1, wherein said organopolysiloxane is

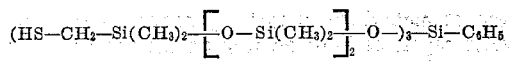

5. Process as claimed in claim 1 wherein said nitrogen base in triethylamine.

6. Process as claimed in claim 1, wherein said R is selected from the group consisting of methyl and phenyl.

7.

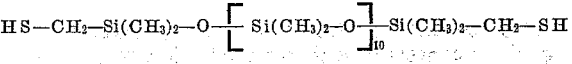

8.

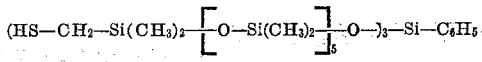

9. A mercaptomethyl-substituted organopolysiloxane of the formula $$[HS-CH_2-Si(CH_3)_2O_{1/2}]_a[RSiO_{3/2}]_b$$
$$[R_2SiO]_c[R_3SiO_{1/2}]_{(2+b-a)}$$

in which $a$ is a whole number of 1 to $(2+b)$, $b$ is a whole number from 0 to 1, $c$ is a positive integer, and each substituent R is a hydrocarbon radical free of aliphatic unsaturation and having 1 to 6 carbon atoms.

References Cited

UNITED STATES PATENTS

| 3,078,292 | 2/1963 | Prober. | |
| 3,312,669 | 4/1967 | Giordano | 260—448.2 X |
| 3,345,393 | 10/1967 | Simmler et al. | |
| 3,364,059 | 1/1968 | Marzocchi | 260—448.2 X |

TOBIAS E. LEVOW, Primary Examiner

PAUL F. SHAVER, Assistant Examiner

U.S. Cl. X.R.

106—3, 13; 424—70

UNITED STATES PATENT OFFICE
CERTIFICATE OF CORRECTION

Patent No. 3,509,193                                  April 28, 1970

Hans Niederprüm et al.

It is certified that error appears in the above identified patent and that said Letters Patent are hereby corrected as shown below:

Column 4, line 20, the structural formula should appear as shown below:

$(HS-CH_2-Si(CH_3)_2 \text{—}[\text{—}O-Si(CH_3)_2\text{—}]_{15}\text{—}O-)_3Si-C_6H_5$ Signed and sealed this 29th day of September 1970.

(SEAL)
Attest:

Edward M. Fletcher, Jr.                              WILLIAM E. SCHUYLER, JR.

Attesting Officer                                                Commissioner of Patents